(12) United States Patent
Tan et al.

(10) Patent No.: US 6,743,889 B1
(45) Date of Patent: Jun. 1, 2004

(54) HYPERBRANCHED ETHER-KETONE CO-POLYMERS

(75) Inventors: Loon-Seng Tan, Centerville, OH (US); Jong-Beom Baek, Beavercreek, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 49 days.

(21) Appl. No.: 10/192,021

(22) Filed: Jul. 10, 2002

(51) Int. Cl.[7] .................................................. C08G 8/02
(52) U.S. Cl. .................. 528/220; 528/175; 528/192; 528/193; 528/205; 525/191; 525/242; 525/326.1; 525/326.2; 525/328.6; 525/328.9
(58) Field of Search .................. 528/220, 175, 528/192, 193, 205; 525/191, 242, 326.1, 326.2, 328.6, 328.9

(56) References Cited

U.S. PATENT DOCUMENTS 4,169,178 A    9/1979    Freeman

OTHER PUBLICATIONS

Baek, J–B, Tan L–S, Synthesis and Characterization of Ether–Ketone Hyperbranched Polymers From Mixtures of AB2 and AB Monomers, *Polymer Preprints* 2001, 42(2), 468–469. (Published Aug. 12, 2001).

*Primary Examiner*—Duc Truong
(74) *Attorney, Agent, or Firm*—Charles E. Bricker; Thomas L. Kundert

(57) ABSTRACT

Novel ether-ketone hyperbranched co-polymers are prepared by co-polymerizing 3,5-bis(4-fluorobenzoyl)phenol and 4-fluoro-4'-hydroxybenzophenone. The resulting copolymer has repeating units of the formula:

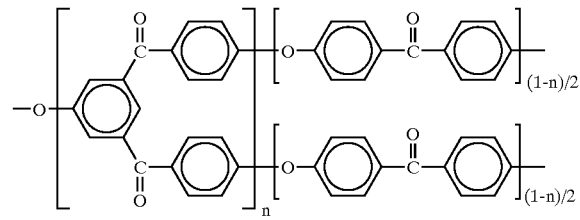

wherein n has a value of 0.25 to 0.99.

4 Claims, No Drawings

HYPERBRANCHED ETHER-KETONE CO-POLYMERS

RIGHTS OF THE GOVERNMENT

The invention described herein may be manufactured and used by or for the Government of the United States for all governmental purposes without the payment of any royalty.

BACKGROUND OF THE INVENTION

The present invention relates to ether-ketone co-polymers, particularly to hyperbranched ether-ketone co-polymers.

Dendritic macromolecules such as dendrimers and hyperbranched polymers are a new class of highly branched polymers that have distinctly different properties from their linear analogs. Both dendrimers and hyperbranched polymers have much lower solution and melt viscosities than their linear analogs of similar molecular weights. They also have a large number of chain-ends whose collective influence dictates their overall physical and/or chemical behaviors. These features are attractive in terms of processability and offering flexibility in engineering required properties for specific applications. However, there is a practical advantage that hyperbranched polymers have over dendrimers at "raw material" level. Although dendrimers have precisely controlled structures (designated as generations), their preparations generally involve tedious, multi-step sequences that are impractical and costly in scale-up production. Synthesis of a hyperbranched polymer, on the other hand, is a one-pot process. Large quantities of hyperbranched polymers can be easily produced from $AB_x$ ($x \geq 2$) monomers.

Poly(ether ketones), PEK's, are a class of well-known engineering plastics. Both linear meta- and para-PEKs have been well studied. Para-PEK generally has a very high melting point (>350° C.), close to the degradation temperature, and limited solubility due to its semi-crystallinity. To improve the processability of para-PEK, conventional wisdom suggests the co-polymerization of the para-PEK monomer, i.e. 4-fluoro-4'-hydroxybenzophenone, with the corresponding meta-monomer so as to disrupt the chain packing. This should result in the reduction of the melting point and crystallinity, and improve the processability.

We have approached the preparation of less crystalline para-PEK by introducing certain degrees of branching via an $AB_2$ monomer into the polymer chain.

Accordingly, it is an object of the present invention to provide novel ether-ketone co-polymers.

Other objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

SUMMARY OF THE INVENTION

In accordance with the present invention there are provided novel ether-ketone hyperbranched co-polymers formed by co-polymerizing 3,5-bis(4-fluorobenzoyl)phenol and 4-fluoro-4'-hydroxybenzophenone.

The resulting copolymer has repeating units of the formula:

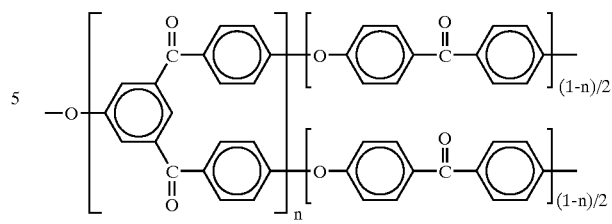

wherein n has a value of 0.25 to 0.99.

DETAILED DESCRIPTION OF THE INVENTION

Preparation of the $AB_2$ monomer, 3,5-bis(4-fluorobenzoyl)phenol, and co-polymerization of the monomer with the AB monomer, 4-fluoro-4'-hydroxybenzophenone is set forth in the Examples which follow.

The co-polymers of this invention are suitable for use in applications where the material will be subject to high service temperatures, e.g., electrical connector moldings.

The following examples illustrate the invention:

EXAMPLE 1

5-Acetoxyisophthalic Acid

Into a 100 mL single-necked, round-bottomed flask equipped with a magnetic stirrer and a nitrogen inlet, 5-hydroxyisophthalic acid (10.0 g, 54.9 mmol) was dissolved in freshly distilled acetic anhydride (50 mL) containing a catalytic amount of fuming sulfuric acid (3 drops). The reaction mixture was then heated at 60° C. with stirring for 24 h. It was poured into ice water and the resulting precipitate was collected by suction filtration and air-dried overnight. The white solid crude product was then dissolved in a mixture of hot ethanol and water (1:1 v/v), and the filtrate was allowed to cool to room temperature to give 12.0 g (97.6% yield) of white solid, m.p. 255–256° C. Anal. Calcd. for $C_{10}H_8O_6$: C, 55.38%; H, 3.60%; O, 42.82%. Found: C, 54.19%; H, 3.23%; O, 42.02%. FT-IR (KBr, $cm^{-1}$): 1703, 1774, 2880. Mass spectrum (m/e): 224 ($M^+$, 100% relative abundance). $^1$H-NMR (DMSO-$d_6$, $\delta$ in ppm): 2.32 (s, 3H, $CH_3$), 7.92 (s, 2H, Ar), 8.37 (s, 1H, Ar). $^{13}$C-NMR (DMSO-$d_6$, $\delta$ in ppm): 20.76, 126.76, 127.11, 132.64, 150.61, 165.76, 169.07.

EXAMPLE 2

5-Acetyloxyisophthaloyl Diacidchloride

Into a 500 mL three-necked round bottom flask equipped with a magnetic stirrer, nitrogen inlet, and a condensor, 5-Acetyloxyisophthaloic acid (10.0 g, 44.6 mmol), thionyl chloride (40 mL), and 5 drops of DMF was placed. The flask was stirred at room temperature for 30 min and then gently heated up to 60° C. for 8 h. Excess amount of thionyl chloride was then distilled off. After cooling down, freshly distilled hexane (300 mL) was added into the flask while it was chilled in ice-salt bath with vigorous stirring. The resulting white needles were collected by quick filtration and dried under reduced pressure to afford 9.10 g (90.1% yield): mp 47.0–48.5° C.: Anal. Calcd. for $C_{10}H_6Cl_2O_4$: C, 46.01%; H, 2.32%; Cl, 27.16%; O, 24.51%: Found: C, 46.82%; H, 2.43%; Cl, 27.89%; O, 24.84%. FT-IR (KBr, $cm^{-1}$): 1773. Mass spectrum (m/e): 260, 262 ($M^+$, 100% relative abundance). $^1$H-NMR (CDCl$_3$, ppm) δ 2.34 (s, 3H, CH$_3$), 7.92–7.93 (d, 2H, Ar), 8.56–8.57 (t, 1H, Ar). $^{13}$C-NMR (CDCl$_3$, ppm) δ 20.94, 126.94, 128.26, 132.78, 150.47, 166.56, 168.92.

EXAMPLE 3

3,5-Bis(4-fluorobenzoyl)phenol

Into a 250 mL three-necked, round-bottomed flask equipped with a magnetic stirrer, a nitrogen inlet, and a dropping funnel, aluminum chloride (10.85 g, 81.4 mmol) and fluorobenzene (80 mL) were introduced. The flask was then placed in an ice-water bath with its temperature maintained between 15–20° C. The solution of 5-acetyloxyisophthaloyl dichloride (8.5 g, 32.5 mmol) in fluorobenzene (20 mL) was then added dropwise for 20 min. The reaction mixture was then allowed to warm up to room temperature and stand with stirring at room temperature for 12 h. The resulting light brown solution was poured into ice-water (500 mL) containing hydrochloric acid (50 mL). Methylene chloride (50 mL) was then added to the mixture and the organic layer was separated with the aid of a separatory funnel. The solvent of the organic extract was then removed on a rotary evaporator. The resulting yellow jelly-like residue was further dried under the reduced pressure to give 11.8 g of 1-acetoxy-3,5-bis(benzoyl)benzene (95.5% crude yield). The 1-acetoxy-3,5-bis(benzoyl)benzene was then dissolved in ethanol (130 mL), followed by the addition of a solution of potassium hydroxide (10.0 g, 178 mmol) in water (20 mL). The resulting mixture was subsequently heated under the reflux for 1.5 h. After it was allowed to cool to near room temperature, the solution was poured into ice-water (500 mL) containing hydrochloric acid (50 mL). The precipitates were collected by suction filtration, air-dried overnight and finally recrystallized from toluene to afford 9.9 g (90% overall yield) of 3,5-Bis(4-fluorobenzoyl)phenol as white crystals, m.p. 133.5–134° C. Anal. Calcd. for C$_{20}$H$_{12}$F$_2$O$_3$: C, 71.01%; H, 3.58%; O, 14.19%. Found: C, 70.79%; H, 3.98%; O, 14.51%. FT-IR (KBr, cm$^{-1}$): 1596, 1657, 3298. Mass spectrum (m/e): 338 (M$^+$, 100% relative abundance). $^1$H-NMR (CDCl$_3$, δ in ppm): 7.13–7.19 (d, 4H, Ar), 7.48–7.49 (d, 2H, Ar), 7.53–7.54 (d, 1H, Ar), 7.84–7.89 (dd, 4H, Ar). $^{13}$C-NMR (CDCl$_3$, δ in ppm): 115.71, 120.52, 121.96, 132.73, 133.36, 138.83, 157.69, 167.34, 194.32.

EXAMPLE 4

Homopolymerization 3,5-bis(4-fluorobenzoyl) phenol

Into a 100 mL three-necked, round-bottomed flask equipped with a mechanical stirrer, nitrogen inlet and outlet, and a Dean-Stark trap with a condenser, 3,5-bis(4-fluorobenzoyl)phenol (2.0 g, 5.91 mmol), potassium carbonate (2.0 g, 14.5 mmol), and a mixture of NMP (20 mL) and toluene (60 mL) were introduced. The reaction mixture was then heated and maintained at 140–150° C. for 4 h. During this time, the water formed was removed by azeotropic distillation. After complete removal of toluene, the orange solution was then heated at 180° C. for another hour and then at 202° C. until the mixture completely stuck to the stirring rod to render further stirring ineffective. The polymerization process took about 40 min at 202° C. The reaction mixture was diluted with NMP (50 mL) and filtered through glass filter while the mixture was still hot (130–150° C.). The filtrate was poured into distilled water containing 5% hydrochloric acid. The resulting white precipitates was collected by suction filtration and air-dried. Off-white powder was dissolved in NMP again and passed through Celite 545 to remove any insoluble salts. The filtrate was poured in 5% hydrochloric acid and the mixture was heated about 60–70° C. for 24 h. The white powder was collected and dried under reduced pressure (1 mm Hg) at 150° C. over phosphorous pentoxide. The yield of the hyperbranched homopolymer was essentially quantitative. T$_g$=159° C. Anal. Calcd. for C$_{20}$H$_{11}$FO$_3$: C, 75.47%; H, 3.48%; Found: C, 75.32%; H, 4.26%. The hyperbranched homopolymer is designated as polymer PEK 5 in Table 1 below.

EXAMPLE 6

Representative Procedure for Co-polymerization

Into a 100 mL three-necked, round-bottomed flask equipped with a mechanical stirrer, nitrogen inlet and outlet, and a Dean-Stark trap with a condenser, 3,5-bis(4-fluorobenzoyl)phenol (AB$_2$; 1.0 g, 2.96 mmol), 4-fluoro-4'-hydroxybenzophenone (1.0 g, 4.63 mmol), potassium carbonate (AB; 2.0 g, 14.5 mmol), and a mixture of NMP (20 mL) and toluene (60 mL) were introduced. The reaction mixture was then heated and maintained at 140–150° C. for 4 h. During this time, the water formed was removed by azeotropic distillation. After complete removal of toluene, the orange solution was then heated at 180° C. for another hour and then at 202° C. until the mixture completely stuck to the stirring rod to preclude effective stirring. The polymerization process took about 40 min at 202° C. The mixture was diluted with NMP (50 mL) and filtered through glass filter while it was still hot (130–150° C.). The filtrate was poured into distilled water containing 5% hydrochloric acid. The resulting white precipitates were collected by suction filtration and air-dried overnight. The off-white powder was re-dissolved in NMP and the resulting solution was passed through Celite 545 to remove any insoluble salts. The filtrate was then poured into 5% hydrochloric acid (300 mL) and then heated around 60–70° C. for 24 h. The white powder was collected and dried under reduced pressure (1 mm Hg) at 150° C. over phosphorous pentoxide. The yield of the hyperbranched copolymer (50 wt % AB: 50 wt % AB$_2$) was essentially quantitative; Tg=213° C. Anal. Calcd. for C$_{20}$H$_{11}$FO$_3$: C, 78.35%; H, 3.76%. Found: C, 76.95%; H, 4.33. The 50:50 AB$_2$:AB copolymer is designated PEK 8 in Table 1 below. The procedure of this example was employed to make other copolymers with different ratios of AB$_2$:AB as seen in Table 1 below.

EXAMPLE 7

Thermal Properties and Wide Angle X-ray Diffraction (WAXS)

The T$_g$'s of the linear and hyperbranched PEK polymers were determined by DSC. The DSC scans were run on the powder samples after they had been heated to 200° C. in the DSC chamber and allowed to cool to ambient temperature under nitrogen purge. The T$_g$ was taken as the mid-point of the maximum baseline shift from the second run. As shown in Table 1, PEK 5 displayed a Tg at 159° C. As the amount of AB monomer content increased, polymer T$_g$'s were increased to 163.7 and 212.5° C. Noteworthy is PEK 7 whose T$_g$ is higher than either the linear PEK or the parent hyperbranched PEK. When the AB content was 75%, the resulting hyperbranched co-polymer became semi-crystalline, displaying a well-defined melting temperature at 340° C. and crystallization temperature at 241° C. The linear PEK has a melting temperature at 361° C. and its crystallization was observed at 272° C. The TGA experiments on the powder samples of linear and hyperbranched PEK's indicated that the temperatures at which a 5% weight losses occurred were in the range of 401–461° C. in air and 410–416° C. in helium.

To correlate with the thermal analysis data, all samples were characterized with an X-ray diffraction technique to determine their degrees of crystallinity. Among the four PEK samples (5, 7–9), the hyperbranched co-polymers with 50 wt % or more $AB_2$ content were amorphous. HB-PEK 9 with 25 wt % of $AB_2$ monomer content displayed peaks at 2.69, 3.03, 3.78, 4.23, 4.67 Å. They were exactly the same as the peak positions observed for the linear PEK, but at lower intensity, indicating lower crystallinity in PEK 9. These results correlated very well with their thermal properties determined by DSC.

We claim:

1. An ether-ketone hyperbranched co-polymer having repeating units of the formula:

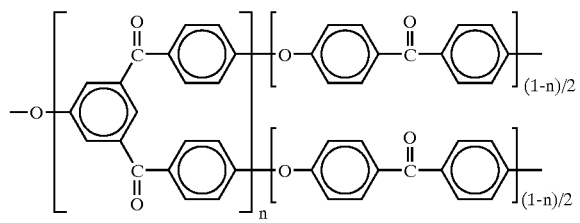

wherein n has a value of 0.25 to 0.99.

TABLE 1

Thermal Properties of linear and hyperbranched polyetherketones

| PEK | $AB_2$ (wt %) | AB (wt %) | $T_{gh}{}^a$ (° C.) | $T_{gc}{}^a$ (° C.) | $T_m{}^a$ (° C.) | $\Delta H_f$ (J/g) | $T_c{}^b$ (° C.) | $\Delta H_c$ (J/g) | $Td_{5\%}$ in Air (° C.) | Char % at 900° C. in air | $Td_{5\%}$ in Helium (° C.) | Char % at 900° C. in helium |
|---|---|---|---|---|---|---|---|---|---|---|---|---|
| 5 | 100 | 0 | 159.2 | 174.6 | — | — | — | — | 409 (485) | 3.5 | 418 (553) | 27.7 |
| 7 | 75 | 25 | 163.7 | 177.6 | — | — | — | — | 401 (532) | 5.8 | 410 (565) | 8.7 |
| 8 | 50 | 50 | 212.5 | 210.3 | — | — | — | — | 411 (542) | 1.2 | 432 (574) | 4.0 |
| 9 | 25 | 75 | — | 170.0 | 339.5 | 19.7 | 241 | 18.1 | 426 (553) | 0.1 | 462 (557) | 31.7 |
| 6 | 0 | 100 | — | 174.6 | 360.5 | 36.9 | 272 | 34.6 | 461 (560) | 0.1 | 463 (552) | 37.6 |

Note

[a]Glass transition temperature ($T_g$) and melting temperature ($T_m$) determined by DSC with heating rate of 10° C./min. $T_{gh}$ and $T_{gc}$ values were determined from the heating and cooling cycles, respectively.
[b]Glass transition temperature ($T_g$) and crystallization temperature ($T_c$) determined by DSC with cooling rate of 10° C./min.
[c]The temperature at which 5% weight loss based on TGA thermogram obtained with a heating rate of 10° C./min. The numbers in parentheses are maximum degradation temperatures.

Having thus described exemplary embodiments of the present invention, it should be noted by those skilled in the art that the disclosures herein are exemplary only and that alternatives, adaptations and modifications may be made within the scope of the present invention.

2. The co-polymer of claim 1 wherein n has a value of 0.5.
3. The co-polymer of claim 1 wherein n has a value of 0.75.
4. The co-polymer of claim 1 wherein n has a value of 0.25.

* * * * *